(No Model.) 2 Sheets—Sheet 1.

J. E. BOYLE.
WATER CLOSET.

No. 354,623. Patented Dec. 21, 1886.

WITNESSES:
Geo. H. Fraser.
Geo. Bainton

INVENTOR:
James E. Boyle
By his Attorneys,
Burke, Fraser Bennett (No Model.) 2 Sheets—Sheet 2.

J. E. BOYLE.
WATER CLOSET.

No. 354,623. Patented Dec. 21, 1886.

WITNESSES:
Geo. H. Fraser.
Geo. Bainton

INVENTOR:
James E. Boyle
By his Attorneys,
Burke Fraser Kennett

UNITED STATES PATENT OFFICE.

JAMES E. BOYLE, OF EAST NEW YORK, N. Y.

WATER-CLOSET.

SPECIFICATION forming part of Letters Patent No. 354,623, dated December 21, 1886.

Application filed March 31, 1886. Serial No. 197,260. (No model.)

*To all whom it may concern:*

Be it known that I, JAMES E. BOYLE, a citizen of the United States, residing at East New York, Kings county, in the State of New York, have invented certain new and useful Improvements in Water-Closets, of which the following is a specification.

This invention is an improvement on what are known as "hopper closets," or those wherein the bowl is in the form of a hopper and communicates with a trap beneath. Such closets are usually flushed after each use, or are given a short flush before and a long flush after use, or a long flush continues all the time that the seat is depressed.

My present invention relates to the construction of the bowl and trap and the connection with the soil-pipe and back-air. I employ an earthenware bowl and set it in a trunk or container which connects directly with the soil-pipe, being, in fact, an enlargement at the upper end thereof. The earthenware bowl is formed at its lower end or outlet with an upturned bend, constituting a trap. By means of this trap a quantity of water is retained in the bottom of the bowl, thereby conducing greatly to the cleanliness of the closet, and the dip of this trap is sufficient to enable the usual trap beneath the floor, or just above the floor, to be dispensed with.

Figure 1:
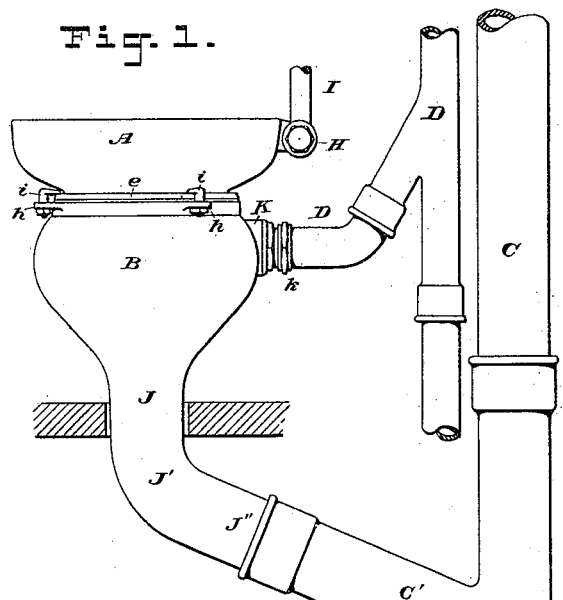
Figure 3:
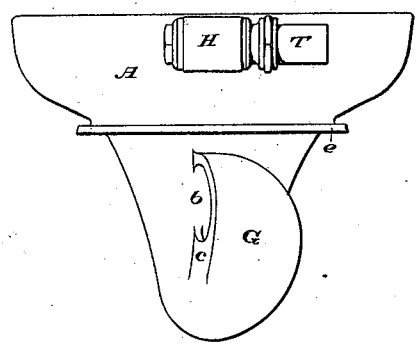
Figure 4:
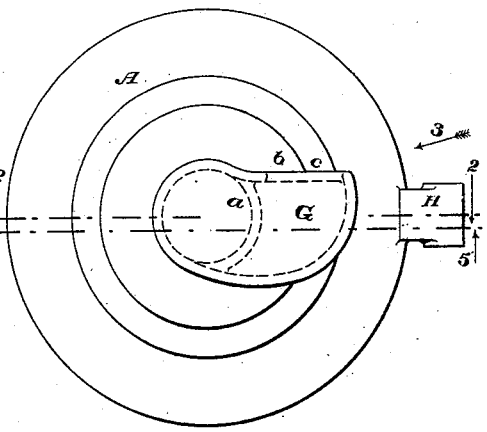
Figure 2:
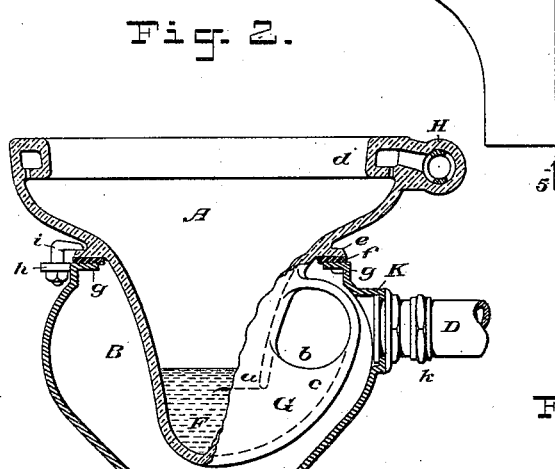
Figure 5:
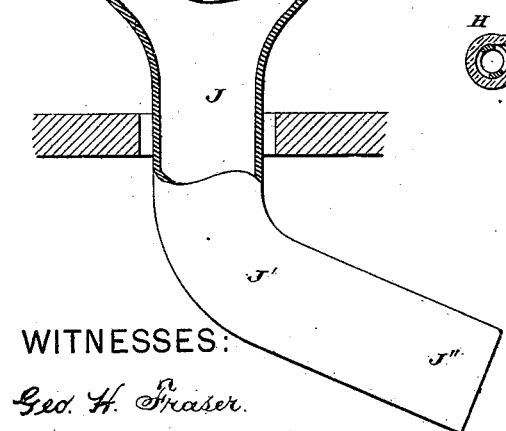
Figure 6:
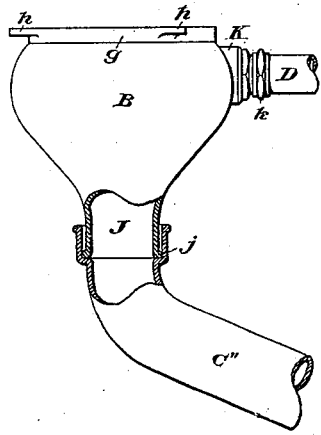
Figure 7:
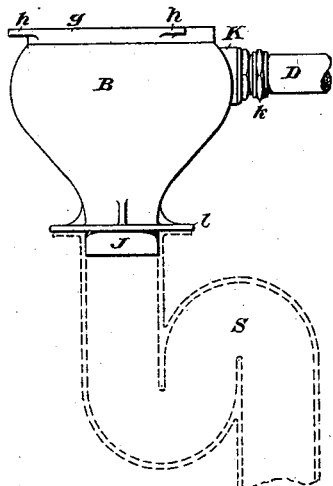
Figures 8, 9:
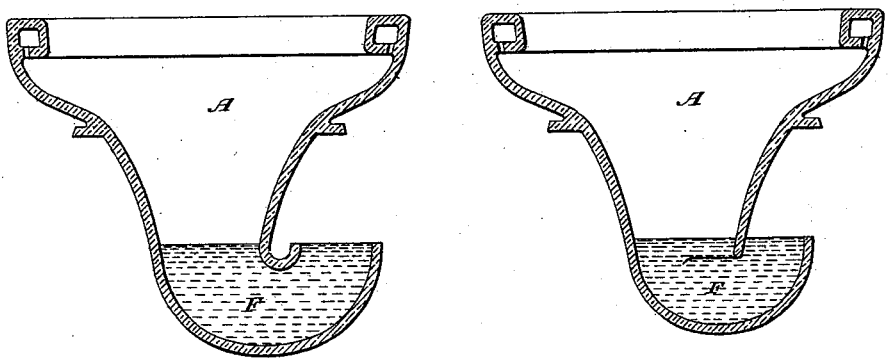
Figure 10:
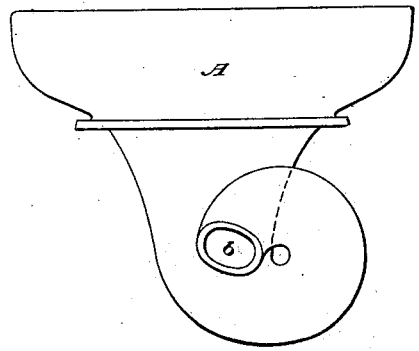

Figure 1 of the accompanying drawings is a side elevation of the closet, showing it set up and in connection with the soil, back-air, and flushing pipes. Fig. 2 is a vertical section of the bowl and trunk. Fig. 3 is an elevation of the bowl removed. Fig. 4 is an inverted plan of the bowl; and Fig. 5 is a section of the bowl, cut in the plane of the line 5 5 in Fig. 4. The remaining views illustrate modifications. Figs. 6 and 7 are side elevations of two different forms of trunk. Figs. 8, 9, and 10 are views showing modified forms of the earthenware bowl.

I will first describe the construction shown in the first five figures.

A is the bowl, and B is the trunk or container. C is the soil-pipe, D the back-air or vent pipe, and E the flush-pipe.

The bowl A is preferably made of porcelain; but it may be of iron enameled upon the inside. It is, by preference, circular in plan. Viewed in elevation, it is preferably contracted rapidly below the flushing-rim, and extended thence downward in approximately conical or horn shape, as shown best in Fig. 5, until it is reduced to about the same diameter as the soil-pipe C. Its outlet is carried thence outwardly on one side and upward sufficiently to form the trap or water seal F. In the preferred construction a lateral hood, G, is formed at the lower end of the bowl, extending to one side and upwardly, as best shown in Figs. 2, 3, 4, and 5, and having the outlet-opening *b* formed in its vertical face or wall *c*, close to the side of the bowl proper. The difference between the level of the bottom of the opening *b* and the bottom of the dip *a* into the trap F determines the depth of seal. The opening *b* is round, in order to facilitate the outward passage of soil, and it is made close to the body of the bowl, in order to direct the outflow as nearly to the center of the trunk B as possible, thereby avoiding the accumulation of foul matters adhering to the inner surface of the trunk.

The bowl is made with the usual flushing-rim, *d*, with the usual tubular "standard" connection, H, or any other suitable connection for joining the flushing-pipe I to the bowl, and with the usual flange, *e*, for resting on the trunk.

The trunk B is a swelled iron pot, preferably enameled on its interior, with a flange, *g*, at its top, on which the flange *e* on the bowl rests, a packing or luting, *f*, of rubber or other suitable material being interposed to make a tight joint. The trunk is formed with perforated eyes or lugs *h h*, through which are passed hooked bolts *i i*, which clamp the flange *e* tightly to the trunk.

The bottom of the trunk is contracted until it is reduced to a neck or leg of the same size as the soil-pipe. This neck or leg is continued downward of this size, as shown at J in Figs. 1 and 2, to beneath the floor, and it then turns to one side with preferably what is known in the trade as an "eighth-bend" at J', extending thence laterally and downward at an angle. Its end J" enters the socket of the usual Y-joint, C', in the soil-pipe C. This joint is tightly packed. The trunk passes freely through the floor, without any flange or foot resting thereon, in order that the entire weight shall be borne by the soil-pipe. Thus if either the soil-pipe or the building should settle the integrity of the joints between the trunk and soil-pipe would not be affected.

The trunk B has a back-air connection, K, cast with it, turned in the same lateral direction as the bend J'. The back-air pipe D is joined to this connection by the usual coupling, k, as shown. As it is customary to arrange the back-air pipe D close to the soil-pipe C, this arrangement of the bend J' and connection K on the same side is of advantage in insuring the correct setting of the closet, especially when the work is being done by an unskillful plumber.

In setting my improved closet the trunk is placed in any desired position, its outlet being turned directly toward the soil-pipe without regard to the position desired for the bowl. The bowl is then put in place and turned to any desired position to bring the connection H into the most convenient relation with the flushing-pipe, after which it is clamped fast to the trunk. The trunk is swelled sufficiently to receive the lateral hood G and to permit this hood to be rotated within the trunk. In inserting or removing the bowl it is necessary to incline it, inserting the hood first and withdrawing it last.

On looking into the bowl of my improved closet only the white porcelain bottom of the bowl is seen, with the water seal above it. The water seal or trap is high up, and in case of any stoppage or impediment (which is not at all likely to occur) the trap is readily accessible by reaching in from the bowl. If it is desired to get access to the soil-pipe, it is only necessary to unfasten the bowl and lift it off. These are important practical advantages as compared with closets the traps of which constitute merely bends in the soil-pipe, whether arranged beneath or above the floor.

My invention also saves the expense of setting an S-trap, which is required by all other hopper closets, so far as I am aware.

Figs. 6 and 7 show two modified constructions of the trunk B. In Fig. 6 the bend J' is omitted and the trunk terminates at or near the floor with the neck J. A branch, C'', is joined to the soil-pipe, and the neck J enters the socket in this branch, as shown, being preferably beaded at j to give it a better hold on the packing. Fig. 7 shows a similar construction, except that the bead j is omitted and the trunk has a flange, l, to be screwed to the floor. This latter construction is not recommended, however, because of the liability to leakage at the joint in case of settling of the building or pipes.

The trap F in the bottom of the bowl A may be made in several ways. Figs. 8, 9, and 10 show three modifications by way of example. In Fig. 8 the throat of the bowl is curved laterally and upward, terminating in a level outlet. This affords a good seal, but requires an unduly strong outflow of flushing-water to carry out the soil, since the water escapes on all sides equally in a comparatively thin stream. Fig. 9 shows a similar construction, wherein the outlet is in the form of a cup, into which the dip a extends. Fig. 10 shows a construction wherein the neck of the bowl is curved around in a spiral sweep, terminating in an outlet-opening, b, which directs the outflow downward. This is a good construction, but not so compact as that shown in Figs. 2 to 5.

While my present invention is designed for use only as a hopper closet, yet, if desired, it may readily be converted into a double-trapped siphon closet of the general character of the one formerly known in the trade as the "Tidal Wave" and now called the "Flume No. 2." This may be done by setting the trunk B in connection with a trap beneath the floor, as denoted by dotted lines at S in Fig. 7, connecting the crown of this trap with the back-air, and connecting the usual suction-pipe or air-pipe with the opening K in the trunk; but to make the closet operate to good advantage in this way some changes of proportion will be desirable, the most important being to increase the dip of the trap F.

I claim as my invention—

1. A water-closet bowl constructed to be set into a trunk, having a flange to rest on said trunk, and formed integrally with a trap or water seal at its lower portion beneath said flange, substantially as set forth.

2. A water-closet bowl constructed to be set into a trunk, having a flange, e, to rest on said trunk, and formed below said flange with its outlet portion extended laterally and upwardly, and with an outlet-opening, b, adjacent to the body of the bowl, substantially as set forth.

3. A water-closet bowl constructed to be set into a trunk, having a flange to rest on said trunk, and formed below said flange with a lateral hood, G, with a dip, a, into said hood to form a water seal, and an outlet-opening, b, through the side of said hood, substantially as set forth.

4. The combination, to form a water-closet, of a trunk and a bowl setting into said trunk, said bowl having a trap or water seal formed integrally with it, which trap isolates the interior of the bowl from the interior of the trunk, substantially as set forth.

5. A water-closet consisting of the combination of a circular bowl, having its outlet extended laterally and forming a trap, with a circular trunk receiving said bowl, and formed with its sides swelled to receive said laterally-extended outlet and permit the latter to be turned by the rotation of the bowl to any position within it, substantially as set forth.

In witness whereof I have hereunto signed my name in the presence of two subscribing witnesses.

JAMES E. BOYLE.

Witnesses:
 ARTHUR C. FRASER,
 GEORGE HOLT FRASER.